United States Patent [19]
Mueller et al.

[11] Patent Number: 5,504,955
[45] Date of Patent: Apr. 9, 1996

[54] METHOD OF RINSING IN A VERTICAL AXIS WASHER

[75] Inventors: Dale E. Mueller, Benton Township, Berrien County; R. Bruce Sherer, St. Joseph Township, Berrien County; Gerald L. Kretchman, St. Joseph Township, Berrien County; Kurt Werner, St. Joseph Township, Berrien County; James W. Titus, Coloma Township, Berrien County; Mark C. Celmer, St. Joseph Township, Berrien County, all of Mich.

[73] Assignee: Whirlpool Corporation, Benton Harbor, Mich.

[21] Appl. No.: 410,655

[22] Filed: Mar. 24, 1995

Related U.S. Application Data

[63] Continuation of Ser. No. 200,084, Feb. 22, 1994, abandoned.

[51] Int. Cl.[6] ............................................... D06F 23/04
[52] U.S. Cl. .......................... 8/158; 8/159; 68/17 R; 68/23.5; 68/23.6; 68/53; 68/131; 68/207
[58] Field of Search ........................ 8/158, 159; 68/17 R, 68/23.5, 23.6, 53, 207, 131

[56] References Cited

U.S. PATENT DOCUMENTS

| | | | |
|---|---|---|---|
| 721,649 | 2/1903 | Pendleton . | |
| 2,145,453 | 1/1939 | Miller | 68/131 X |
| 2,186,786 | 1/1940 | Jensen | 68/131 X |
| 2,438,273 | 3/1948 | Eastes | 68/152 |
| 2,520,366 | 8/1950 | Kirby | 68/148 |
| 2,554,573 | 5/1951 | Johnson | 68/131 X |
| 2,574,170 | 11/1951 | Cockerill et al. | 68/23 |
| 2,574,617 | 11/1951 | Bryant | 68/23 |
| 2,614,410 | 10/1952 | Kirby | 68/23 |
| 2,655,804 | 10/1953 | Clark | 68/23 |
| 2,658,372 | 11/1953 | Kirby | 68/23 |
| 2,663,176 | 12/1953 | Graham | 68/171 |
| 2,669,660 | 1/1955 | Kirby | 68/23 |
| 2,776,558 | 1/1957 | Vang | 68/53 |
| 2,797,569 | 7/1957 | Kirby | 68/23 |
| 2,802,356 | 8/1957 | Kirby | 68/23 |
| 2,831,333 | 4/1958 | Smith | 68/131 |
| 2,867,105 | 1/1959 | Landwier | 68/131 X |
| 2,883,844 | 4/1959 | Gil et al. | 68/156 |
| 2,902,851 | 9/1959 | Fields | 68/131 |
| 2,931,201 | 4/1960 | Hubbard | 68/131 |
| 2,948,128 | 8/1960 | Smith | 68/10 |
| 2,974,515 | 3/1961 | Smith et al. | 68/131 |
| 3,102,410 | 9/1963 | Doyle | 68/23.6 X |

(List continued on next page.)

FOREIGN PATENT DOCUMENTS

| | | | |
|---|---|---|---|
| 218880 | 11/1958 | Australia | 68/23.6 |
| 1096362 | 1/1955 | France | 68/23.6 |
| 3068197 | 3/1988 | Japan . | |
| 795302 | 5/1958 | United Kingdom | 68/23.6 |

*Primary Examiner*—Philip R. Coe
*Attorney, Agent, or Firm*—Thomas A. Schwyn; Joel M. Van Winkle

[57] ABSTRACT

A method of rinsing in an automatic washer having an imperforate wash tub, a perforate wash basket disposed within the tub and rotatable about a vertical axis and a bottom plate disposed within the lower portion of the wash basket and mounted for wobbling motion. The method of rinsing includes adding rinse liquid into the wash basket and recirculating the rinse liquid over the clothes items while driving the bottom plate in a nutating movement. Nutating movement describes the movement of the bottom plate wherein the bottom plate is slowly rotated within the wash basket while being driven in a rapid wobbling motion. In this fashion, the clothes are repeatedly moved under a spray pattern of rinse liquid while being jostled and flexed for achieving the desired excellent detergent and soil removal during rinse. In a second embodiment, the step of slowly rotating the wash basket for moving the clothes under a spray pattern of rinse liquid is combined with a step of wobbling the bottom plate for agitating the clothes while spraying rinse liquid onto the clothes items.

30 Claims, 9 Drawing Sheets

U.S. PATENT DOCUMENTS

| | | | |
|---|---|---|---|
| 3,139,771 | 7/1964 | Maroth | 74/800 |
| 3,139,772 | 7/1964 | Maroth | 74/800 |
| 3,520,158 | 7/1970 | Takeyana | 68/23.6 |
| 3,952,557 | 4/1976 | Bochan | 68/23.3 |
| 3,962,892 | 6/1976 | Garlinghouse | 68/23 |
| 4,072,030 | 2/1978 | Garlinghouse | 68/23 |
| 4,168,615 | 9/1979 | Condit | 68/207 |
| 4,193,275 | 3/1980 | Bochan | 68/134 |
| 4,440,004 | 4/1984 | Bochan | 68/23 |
| 4,495,784 | 1/1985 | Ikeda | 68/23.6 |
| 4,987,627 | 1/1991 | Cur et al. | 68/23.5 X |

1

METHOD OF RINSING IN A VERTICAL AXIS WASHER

This is a continuation of application Ser. No. 08/200,084, filed Feb. 22, 1994, now abandoned.

BACKGROUND OF THE INVENTION

The present invention relates to a vertical axis clothes washer and more particularly to a method of rinsing in a vertical axis clothes washer having a bottom plate capable of a wobble motion.

Attempts have been made to provide an improved automatic clothes washer which uses less energy and water, while providing comparable or superior wash results to present commercially available automatic washers. For example, such an improved washer may advantageously employ the system and processes shown and described in U.S. Pat. Nos. 4,784,666 and 4,987,627, both assigned to the assignee of the present invention, and incorporated herein by reference.

The basis of these systems stems from the optimization of the equation where wash performance is defined by a balance between the chemical (the detergent efficiency and water quality), thermal (energy to heat water), and mechanical (application of fluid flow through—fluid flow over—fluid impact—fabric flexing) energy inputs to the system. Experience has shown that any reduction in one or more energy forms requires an increase in one or more of the other energy inputs to produce comparable levels of wash performance.

Typically, a conventional vertical axis washer functions by loading fabric items to be washed into a vertically aligned wash basket disposed within a wash tub and further having a vertically orientated agitator centrally supported within the wash basket. Detergent and water are supplied into the tub and basket for forming a wash liquid such that the fabric items are completely submerged in wash liquid, and wherein the oscillation of the agitator causes the clothes to move in the wash liquid within the wash basket. In this configuration, the detergent provides a chemical energy input, the introduction of hot/warmwater for mixing with the detergent provides a thermal energy input, and the action of the agitator provides a mechanical energy input, whereby all of these energy inputs act together to remove soil from the fabric items.

This system of washing requires a large amount of water, as much as 46 gallons for one clothes load, to suitably wash clothes. This is due to the fact that for the oscillating agitator to properly apply mechanical energy to the clothes without damaging them, all of the fabric items must be substantially submerged in wash liquid. This complete submersion of the fabric items occurs during the wash cycle and each of the subsequent rinse cycles. To substantially reduce the amount of wash liquid used in a vertical axis washer, alternate means for inputting mechanical energy to the wash load have been contemplated which do not require complete submersion of all of the fabric items. Pending U.S. patent application Ser. No. # 07/815,781, Kovich et. al., assigned to the assignee of the present invention and incorporated herein by reference, discloses a vertical axis washer utilizing a system for imparting mechanical energy into the fabric items wherein a substantial reduction in water consumption may be achieved. In this system the washer is provided with a basket having a ramp and baffle extending inwardly from the basket.

Other systems for imparting mechanical energy into fabric items clothes load in a vertical axis washer are also known. In U.S. Pat. No. 2,802,356 to Kirby, a vertical axis washer is provided wherein a wash basket is disposed within a tub. No agitator is provided for agitating the clothes, rather, the wash basket is mounted for providing a wobbly motion within the tub such that during the wash cycle, the basket is filled with wash liquid and is given a wobbling motion which agitates and distributes the clothes and thoroughly washes them. No teaching or suggestion of reduced water consumption is provided by Kirby.

In U.S. Pat. No. 2,145,453 to Miller, a vertical axis washer is provided having a bottom plate mounted for gyratory motion within a wash tub. No wash basket is provided. During wash, the bottom plate is driven in a gyratory oscillating movement such that the clothes are agitated. Miller teaches the complete submersion of the fabric item within wash liquid during the wash cycle.

Significantly greater savings in water usage and energy usage than is achieved by heretofore disclosed vertical axis wash systems would be highly desirable. Furthermore, it would be a significant improvement in the art to provide a system for imparting mechanical energy to fabric items in a vertical axis washer without requiring complete submersion of the clothes with wash liquid.

SUMMARY OF THE INVENTION

One of the objects of the present invention, therefore, is to provide a method of rinsing in a vertical axis washer which uses a minimum amount of water and energy.

Another object is to provide a method of rinsing in a vertical washer which imparts mechanical energy to a clothes load to loosen soil and detergent but does not require complete submersion of the clothes in rinse liquid.

An additional object of the present invention is to provide a method of operating a vertical washer having a bottom plate mounted for gyratory motion disposed in the lower portion of a rotatable wash basket for achieving the optimum input of chemical, mechanical and thermal energy inputs for optimal washing of a clothes load.

According to the present invention, the foregoing and other objects are attained by an automatic washer having an imperforate wash tub, a perforate wash basket disposed within the tub and rotatable about a vertical axis and a bottom plate disposed within the lower portion of the wash basket and mounted for wobbling motion. A motor is selectively interconnected with the basket and bottom plate for rotating the basket and the bottom plate together and for wobbling the bottom plate relative to the wash basket while the basket is held stationary such that the clothes items are agitated within the wash basket. In the preferred embodiment, a controlled rotation device is provided for driving the bottom plate in a wobbling motion while rotating the bottom plate, at a reduced rate, within the bottom of the wash basket. In a second embodiment, the wobble plate is supported and constrained to be driven in a wobbling motion while experiencing no rotation within the basket.

The present invention is further provided with a liquid level control system for supplying an optimum quantity of wash liquid into the tub wherein the clothes items within the wash basket are washed in an out-of-water wash process rather than being submerged. A recirculation system operates to pump wash liquid from a sump, disposed in the bottom of the tub, through a recirculation line and onto and through the clothes disposed within basket.

In the preferred embodiment, the method of rinsing in the washer includes adding rinse liquid and recirculating the rinse liquid over the clothes while driving the bottom plate in a nutating movement. Nutating movement describes the movement of the bottom plate wherein the bottom plate is slowly rotated within the wash basket while being driven in a rapid wobbling motion. After a predetermined period of time, the rinse liquid is drained from the wash tub. In this fashion, the clothes are repeatedly moved under a spray pattern of rinse liquid while being jostled and flexed for achieving the desired excellent detergent and soil removal during rinse. In a second embodiment, the step of slowly rotating the wash basket for moving the clothes under the spray pattern of rinse liquid is combined with a step of wobbling the bottom plate for agitating the clothes while spraying rinse liquid onto the agitating clothes items. In this fashion, the clothes are moved under the spray of wash liquid in one mode and agitated within the wash basket in another mode.

DESCRIPTION OF THE PREFERRED EMBODIMENT

Figure 1:
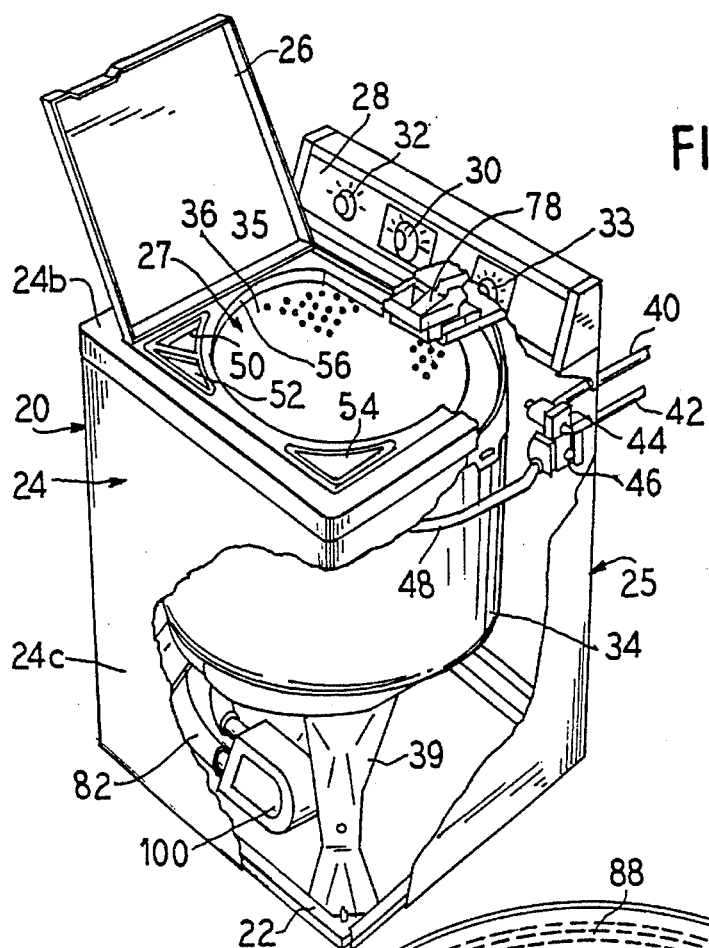
FIG. 1 is a perspective view of an automatic washer, partially cut away to illustrate various interior components.
Figure 2:
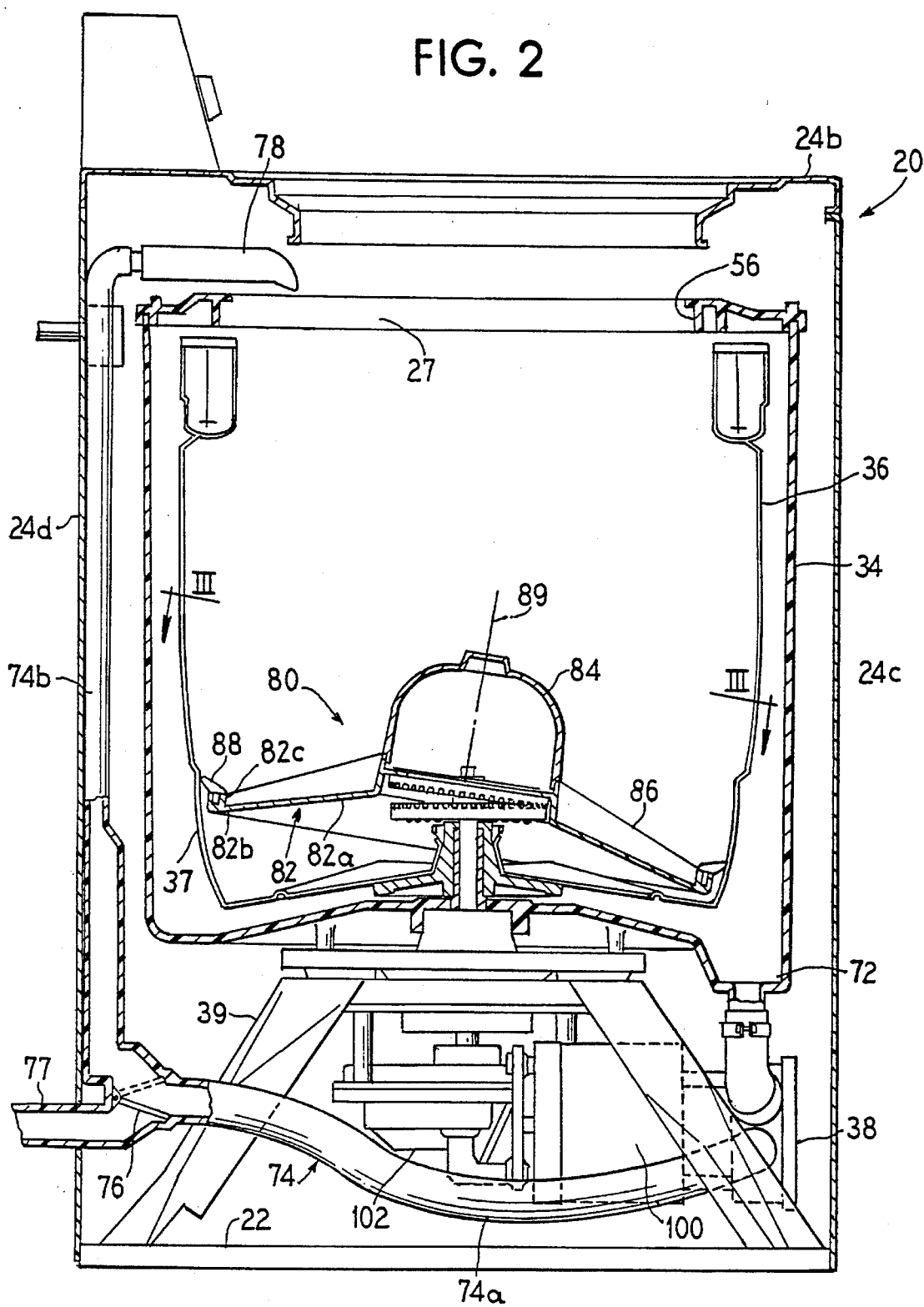
FIG. 2 is a side sectional view of the washer.

In FIGS. 1 and 2, reference numeral 20 indicates generally a washing machine of the automatic type, i.e., a machine having a pre-settable sequential control means for operating a washer through a preselected program of automatic washing, rinsing and drying operations in which the present invention may be embodied. The machine 20 includes a frame 22 carrying vertical panels 24 forming the sides 24a, top 24b, front 24c and back 24d of the cabinet 25 for the washing machine 20. A hinged lid 26 is provided in the usual manner to provide access to the interior or treatment zone 27 of the washing machine 20. The washing machine 20 has a console 28 including a timer dial 30 or other timing mechanism and a temperature selector 32 as well as a cycle selector 33 and other selectors as desired.

Internally of the machine 20 described herein by way of exemplifications, there is disposed an imperforate fluid containing tub 34 within which is a spin wash basket 36 with perforations or holes 35 therein, while a pump 38 is provided below the tub 34. The spin basket 36 defines a wash chamber and includes a partly spherical inside wall surface 37 extending upwardly from a substantially flat bottom. A motor 100 is operatively connected to the basket 36 through a transmission 102 to rotate the basket 36 relative to the stationary tub 34. All of the components inside the cabinet 25 are supported by struts 39.

Water is supplied to the imperforate tub 34 by hot and cold water supply inlets 40 and 42. A hot water valve 44 and a cold water valve 46 are connected to manifold conduit 48. The manifold conduit 48 is interconnected to a plurality of wash additive dispensers 50, 52 and 54 disposed around a top opening 56 above the tub 34, just below the openable lid 26. As seen in FIG. 1, these dispensers are accessible when the hinged lid 26 is in an open position. Dispensers 50 and 52 can be used for dispensing additives such as bleach or fabric softeners and dispenser 54 can be used to dispense detergent (either liquid or granular) into the wash load at the appropriate time in the automatic wash cycle. As shown schematically in FIG. 8, each of the dispensers 50, 52 and 54 is supplied with liquid (generally fresh water) through separate, dedicated conduits 58, 60, 62 respectively. Each of the conduits 58, 60 and 62 may be connected to a fluid source in a conventional manner, as by respective solenoid operated valves 64, 66 and 68, which contain built-in flow devices to give the same flow rate over wide ranges of inlet pressures, connecting each conduit to the manifold conduit 48.

Disposed at the bottom of the tub 34 is a sump portion 72 for receiving wash liquid supplied into the tub through wash additive dispensers 50, 52 and 54. A pressure sensor 73 is disposed in the sump 72 for controlling the quantity of wash liquid added to the wash tub 34. The pump 38 is fluidly interconnected with the sump 72 and is operable for drawing wash liquid from the sump 72 and moving wash liquid through a recirculation line 74 having a first portion 74a and a second portion 74b. A 2-way drain valve 76 is provided in the recirculation line 74 for alternatively directing wash liquid flow to a drain line 77 or to the second portion 74b of the recirculation line 74. A nozzle 78 is fluidly interconnected with the recirculation line 74. The nozzle 78 extends beyond the top opening 56 of the tub 34 and is positioned above the wash basket 36 such that wash liquid flowing through the recirculation line 74 is sprayed into the basket 36 and onto clothes disposed in the basket 36 below the nozzle 78. In this fashion, therefore, wash liquid may be recirculated over clothes disposed in the wash basket 36. Furthermore, the pressure sensor 73 may be operated during wash liquid recirculation for controlling the level of wash liquid in the tub 34 to be below the clothes load such that the clothes are not submerged in wash liquid as in a conventional washer. In this fashion, the clothes are washed in an out-of-water wash process as will be further described herein below.

Figure 3:
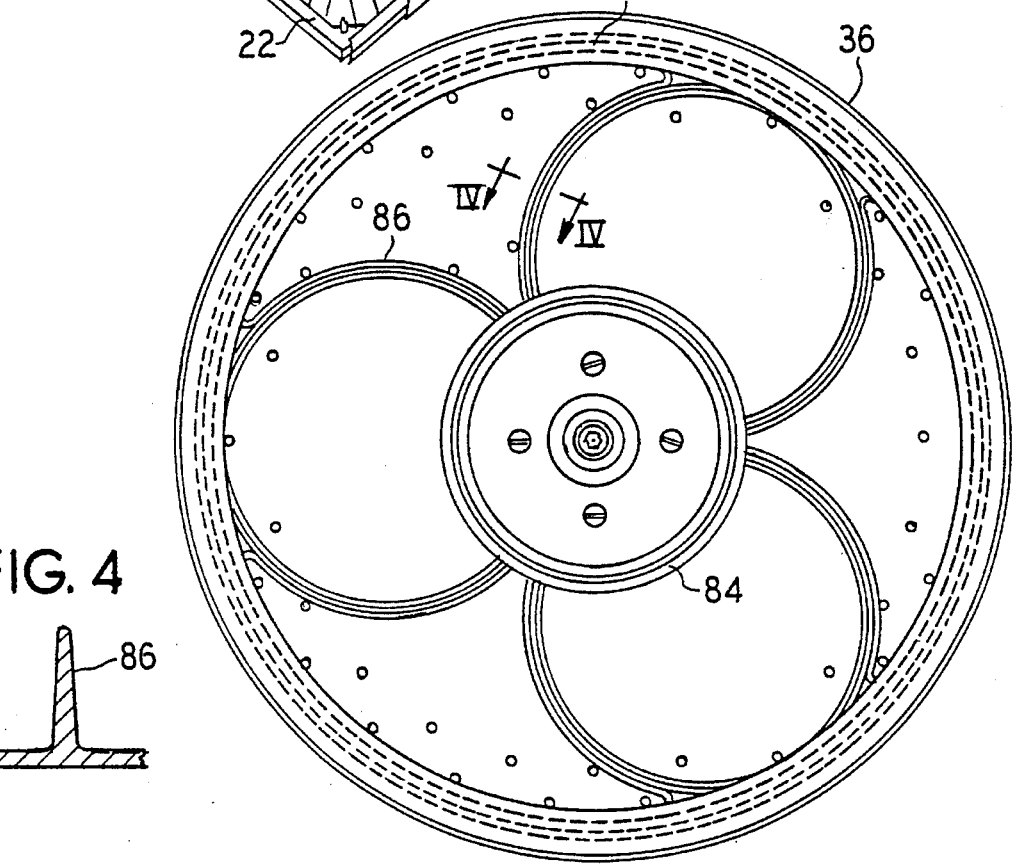
FIG. 3 is a cross-sectional view taken along lines III—III of FIG. 2.
Figure 4:
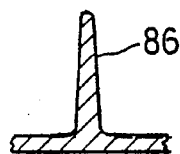
FIG. 4 is a cross-sectional view taken along lines IV—IV of FIG. 3.

Positioned within the lower portion of the wash basket is a bottom plate 80 having an annular bowl member 82 and a raised center dome member 84, as shown in FIGS. 2 and 3. The annular bowl member 82 is defined by a conically shaped downwardly extending portion 82a extending toward a lowest point 82b (relative to the bowl member) and a upturned lip portion 82c disposed about the downwardly extending portion 82a. Extending across the annular bowl member 82 upwardly from the downwardly extending portion 82a are a plurality of ribs 86, shown in detail in FIG. 4. A seal member 88 extends from the upturned lip portion 82a of the annular bowl member 82 for sealingly engaging the partly spherical inside wall surface 37 of the basket 36. The bottom plate assembly 80 defines a center axis 89 and the bottom plate 80 is mounted within the basket 36 such that the center axis 89 of the bottom plate is at an angle relative to the center axis of the basket 36 and tub 34. Further, the bottom plate 80 is operatively connected to the motor 100 and to the transmission 102 such that the bottom plate may be driven in a wobbly motion relative to the wash basket 36 while holding the wash basket 36 stationary.

Figure 5:
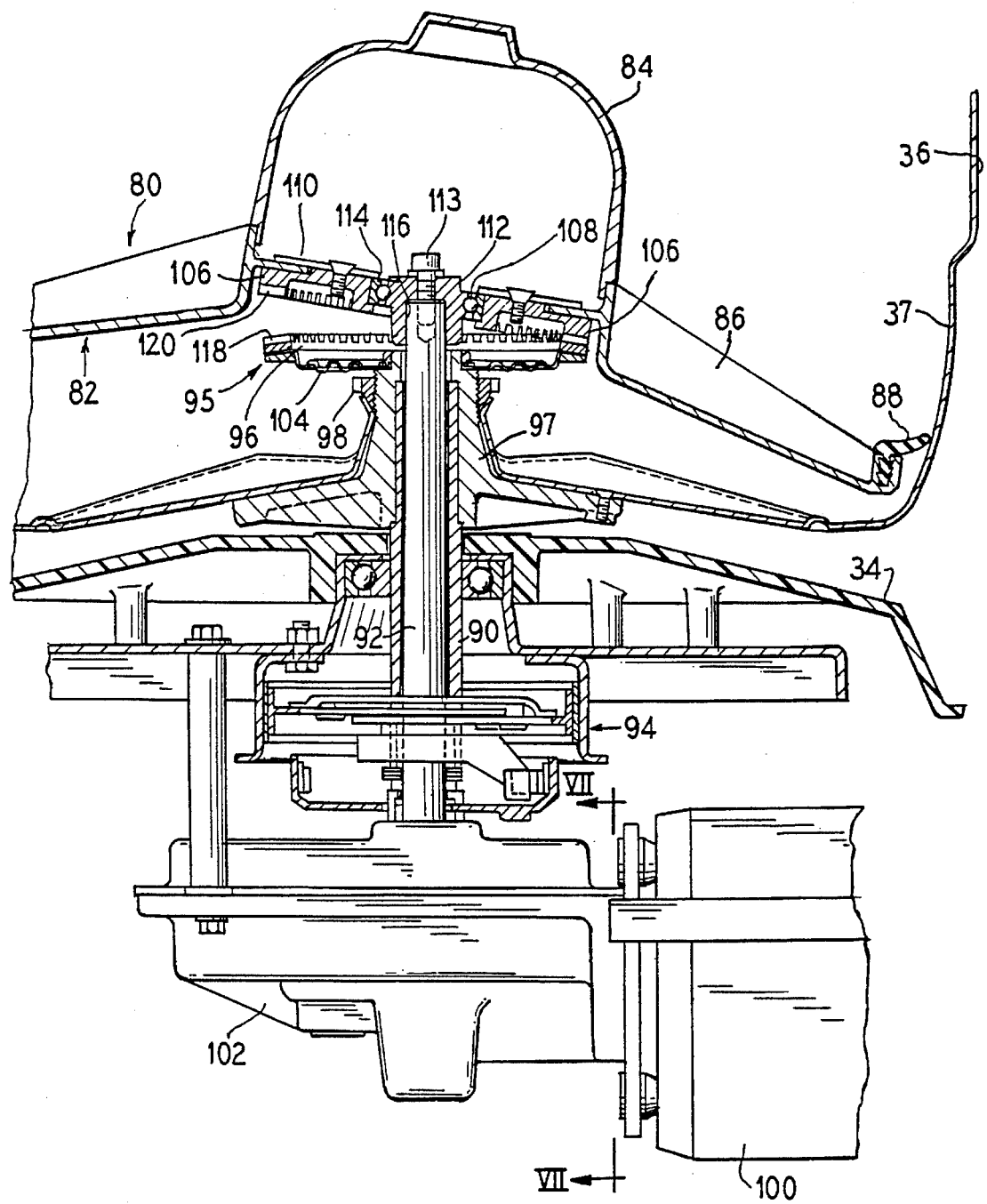
FIG. 5 is a detailed sectional view of a portion of the wash basket, bottom plate and associated drive means of the automatic washer of FIG. 2.

Turning now to FIG. 5, details of the preferred embodiment of the drive system for the bottom plate are shown. It can be seen that a spin tube 90 is disposed around a drive shaft 92, both of which are drivingly interconnected with the transmission 102. A brake mechanism 94 operates in association with the spin tube 90 and the drive shaft 92 for braking the rotation of the spin basket 36. The brake mechanism 94 is shown in greater detail in U.S. Pat. No. 4,254,641 to Gauer et al. having the same assignee as the present invention, the disclosure of which is hereby incorporated by reference. The spin tube 90 sealingly extends through the tub 34 and is attached to the wash basket 36 by a drive block 97, which may be keyed to the spin tube 90. A drive nut 98 is threaded onto the drive block and wedges the basket 36 between the drive block 97 and the nut 98. Threaded fasteners may be provided for further securing the basket 36 to the drive block 97.

A controlled rotation gear system 95 is provided for driving the bottom plate to achieve bottom plate wobble in combination with bottom plate rotation. The bottom plate 80 is attached to the drive shaft 92 through a wobble gear 106, a center bearing 108 and a plate 110. The center bearing 108 includes a inner ring 112 which may be keyed to the drive shaft 92 and an outer ring 114 wherein the inner ring 112 has an inner bore 116 provided at a fixed angle relative to the axis defined by the outside diameter of the outer ring 114. A threaded fastener 113 secures the drive shaft 92 to the inner ring 112. The outer ring 114 is further press fit into the inner diameter of the wobble gear 106. The plate 110 is fastened to the wobble gear 106 for securing the bottom plate 80 to the wobble gear 106 such that the bottom plate 80 is supported at a fixed angle relative to the bottom of the wash basket 36. In this fashion, the wobble gear 106, and thereby the bottom plate 80, is freely journaled on an inclined axis that may gyrate about the central axis of the drive shaft 92.

Attached to the upper portion of the drive block 97 is a wave spring 104 supporting a straight base gear 96. Disposed on the top surface of the base gear 96 are a plurality of radial teeth 118, which mesh with a corresponding plurality of radial teeth 120 provided on the bottom surface of the wobble gear 106. The wave spring 104 is provided for accommodating positional tolerance between the base gear 96 and the wobble gear 106 such that they properly engage. As the wobble gear 106 gyrates around the central axis of the drive shaft 92, engagement of the teeth 120 of the wobble gear 106 with the teeth 118 of the base gear 96 prevents corresponding rotation of the wobble gear 106 with the drive shaft 92. For each rotation of the drive shaft 92, the wobble gear 106 experiences a 360° wobble, wherein all of the teeth 120 of the wobble gear 106 consecutively engage with the base gear 96.

As can be seen, due to the fixed angle at which the wobble gear 106 is supported, the wobble gear has a substantially greater diameter than the base gear 96 which allows the wobble gear 106 to carry a greater number of radial teeth 120 than the base gear 96 and causes a gear ratio to exist between the base gear 96 and the wobble gear 106. This gear ratio rotatably forwards the wobble gear 106 by a predetermined angle for each rotation of the drive shaft 92. In this fashion, engagement of the wobble gear 106 with the base gear 96 provides for a controlled rotation of the wobble gear 106 around the axis of the drive shaft 92. In the preferred embodiment, the controlled rotation gear system 95 may be configured to rotate the bottom plate at between 2–8 RPM.

As understood by one skilled in the art, the gear ratio may be adjusted to provide optimal rotational speed of the bottom plate 80 by varying the difference in diameter between the wobble gear 106 and the base gear 96. This effectively can be accomplished by varying the fixed angle at which the bottom plate 80 is supported thereby increasing the diameter of the wobble gear 96 or by varying the height of the wobble gear 106 thereby decreasing the diameter of the base gear 96.

The motion of the bottom plate 80, therefore, generally consists of a gyratory oscillation of the bottom plate 80 in such a manner that each point on the periphery of the bottom plate 80 is individually, and successively in one direction, raised to a maximum upper limit and then lowered to a minimum lower limit in a wave-like or undulatory motion so that the high point of the bottom plate 80 periphery gyrates precessionally about the central axis of the drive shaft. Furthermore, due to the gear ratio between the wobble gear 106 and the base gear 96, the bottom plate 80 slowly rotates around the center axis at a rotational speed substantially reduced from the rotation speed of the drive shaft 92. It can be understood, therefore, that every marginal point of the bottom plate 80 is in motion vertically either toward or away from the maximum upper limit and furthermore is slowly rotating about the central axis of the drive shaft. This motion of the bottom plate 80 will be heretofore referred to as bottom plate wobble with rotation or nutation or nutating movement.

In view of the above discussion, a clear understanding of the terms used to define the bottom plate motion is beneficial to a full understanding of the present invention. The term "wobble" or "wobbling" refers to the gyratory motion described above in which the high point of the bottom plate periphery gyrates precessionally about the central axis of the drive shaft. Bottom plate "wobble" or "wobbling" may, but does not necessarily, include bottom plate rotation. In contrast, the term "nutate" or "nutation" more narrowly refers to the motion of gyratory oscillation and includes bottom plate rotation. In this definition, nutation can be seen as a subset of the motion of wobbling.

Figure 6:
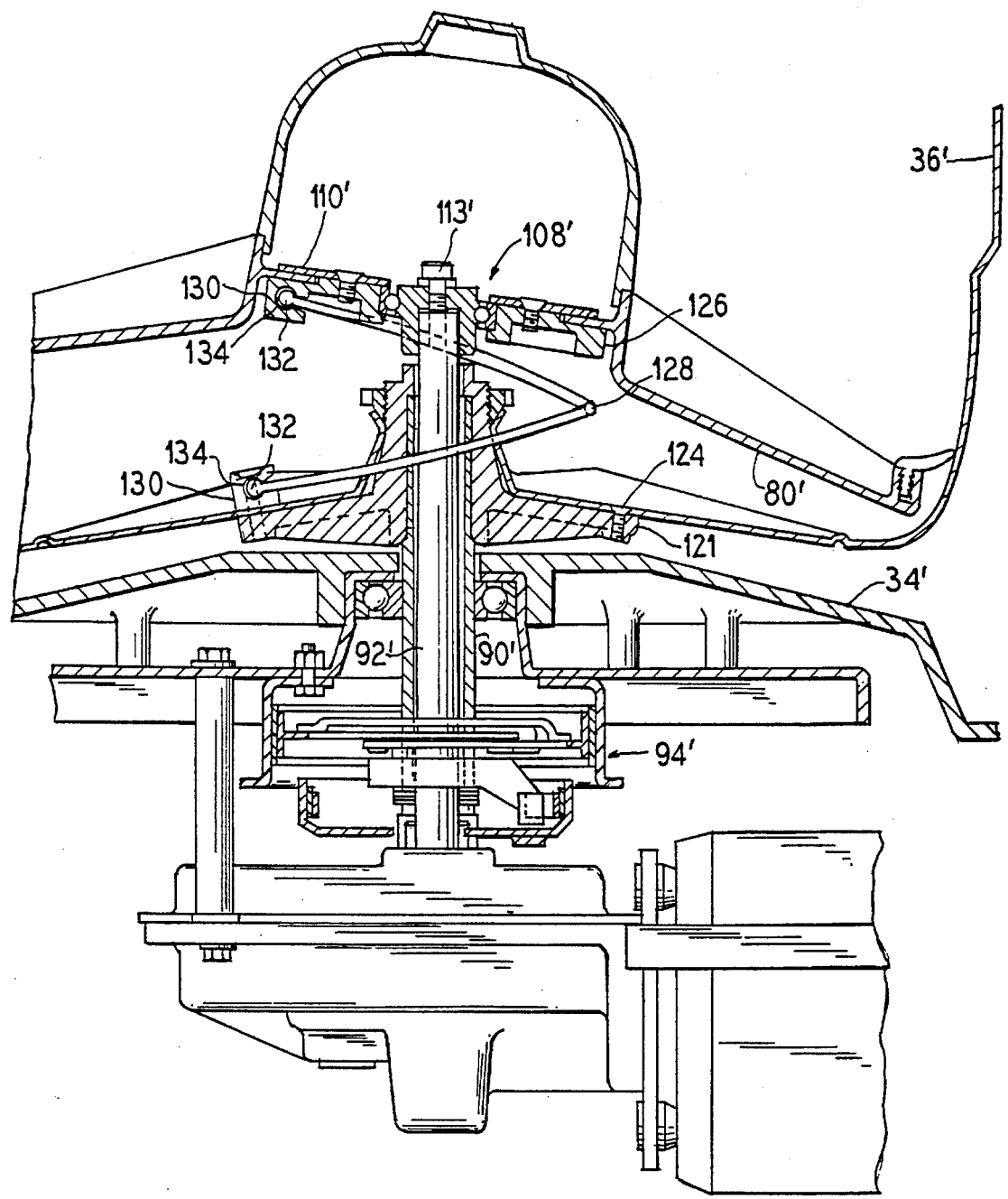
FIG. 6 is a detailed sectional view of a portion of an alternative embodiment of the wash basket, bottom plate and associated drive means of the automatic washer of FIG. 2.

In FIG. 6, an alternative embodiment for imparting a wobbly movement to the bottom plate 80' is shown. In this embodiment the wash basket 36' is attached to the spin tube 90' by a drive block 121 and threaded fasteners 124. The bottom plate 80' is attached to the drive shaft 92' through a wobble plate 126 utilizing a center bearing 108' and plate 110' as described above. In a similar fashion, therefore, the bottom plate is again freely journaled on an inclined axis that may gyrate about the central axis of the drive shaft 92'.

In this embodiment, however, no gear engagement between the wobble plate 126 and the drive block 121 exists. Rather, a wobble spring 128 is provided for engaging the bottom plate 80' with the fixed wash basket 36'. Rotation of the drive shaft 92' causes the bottom plate to wobble as previously described. However, the wobble spring 128 rotationally fixes the bottom plate 80' with respect to the wash basket such that no rotation of the bottom plate 80' around the axis of the drive shaft 92' occurs during the wobbling of the bottom plate 80'.

The wobble spring 128 is attached to both the wobble plate 126 and the drive block 120 by way of socket members 130. The socket members 130 receive spheres 132 disposed at the terminal ends of the wobble spring 128 such that the terminal ends of the wobble spring 128 are free for limited lateral and longitudinal angular motion.

The driving of the bottom plate 80' as described above has been shown to provide excellent mechanical energy input to a load of clothes items placed within the wash basket. However, it has been found that the action of the bottom plate 80 in an out-of-water wash process as presently contemplated, may cause the clothes items to tangle. This tangling primarily occurs in the center portion of the wash basket when various clothes items overlap each other. It has been found that the outer periphery of the bottom plate 80 moves the clothes at a relatively faster RPM than the center of the bottom plate 80, thus creating a potential interlocking and tangling of the clothes. However, various elements have been incorporated into the preferred embodiment for overcoming this tendency of the clothes items to tangle.

Looking now back at FIG. 2 and 3, it can be seen that the conically shaped downwardly extending portion 82a is the primary surface contacting the clothes items during bottom plate wobble. Further, it can be understood that the force applied by the downwardly extending portion 82a is directed upwardly, relative to the tub bottom, and outwardly, relative to the center axis of the wash basket 36. In this fashion, the clothes items loaded into the wash basket are continually urged outwardly toward the outer periphery of the wash basket thereby minimizing the portion of clothes disposed in the center of the basket 36 and the possibility of tangling.

The structure of the center dome 84 is also configured to minimize the possibility of tangling. As shown, the center dome 84 extends a substantial distance upwardly from the upper surface of the annular bowl portion 82. The size and height of the dome are such that for most normal loads, the height of wetted clothes items in the wash basket 36 is less than or just slightly greater than the height of the dome 84. In a wash basket having a volume of 3 cubic feet, as preferably contemplated in the present invention, the dome 84 extends upwardly approximately ¼ of the overall height of the wash basket.

Figure 7:
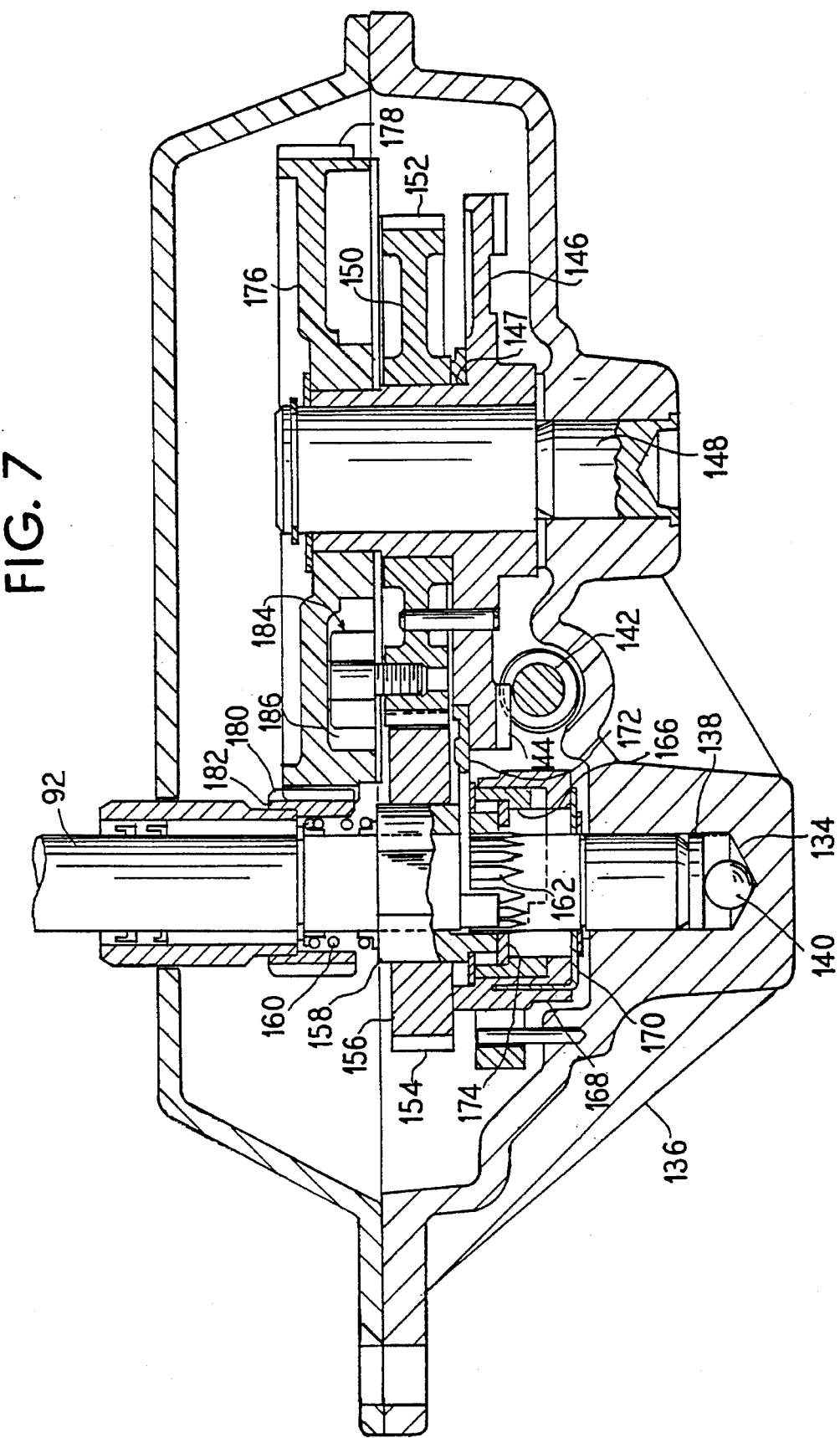
FIG. 7 is a cross-sectional view taken along lines VII—VII of FIG. 5.

Turning now to FIG. 7, the transmission 102 is shown in a detailed sectional view. The transmission 102 is a modification of the transmission mechanism disclosed in U.S. Pat. No. 4,291,556 to Mason, having the same assignee as the present invention, the specification of which is incorporated herein by reference.

It can be seen that the drive shaft 92 extends into a receptacle 134 in a housing 136 of the transmission 102 and rests on a bearing a plate 138 and bearing 140 allowing rotation of the shaft 92 about its central vertical axis with a minimum of friction. Rotational movement is imparted to the agitator shaft 92 as follows. A worm gear 142 is attached to a drive shaft journaled in transmission housing 136 and driven by the motor 100. The worm 142 engages teeth 144 on a main gear 146, thereby imparting rotational movement to the main gear 146 about a jack shaft 148. An eccentric 147 is integrally formed on an upper portion of the main drive gear 146. The jack shaft 148 and the drive shaft 92 are parallel to each other, and a drive gear 150 is provided for selectively driving the drive shaft 92.

The drive gear 150 has teeth 152 about the circumference which engage teeth 154 carried on a hub gear 156. A drive hub 158 engages the hub gear 156 for co-rotation. The drive hub 158 is axially movable along the drive shaft 92 and in response to the urgings of a compression spring 160 may engage splines 162, disposed on the drive shaft such that rotational motion of the drive hub is transferred to the drive shaft 92 which in turn causes the bottom plate 80 to wobble.

It is desired to maintain the drive hub 158 and the drive shaft 92 in engagement only during the agitate portion of the laundry appliance cycle to nutate the bottom plate 80, and to disengage the drive hub 158 and the drive shaft 92 during a spin portion of the cycle so that the bottom plate 80 is free to rotate with the spin basket 36. When this sequence of events is repeated, it is then desirable to re-engage the drive hub 158 and the drive shaft 92 to allow the nutation motion of the bottom plate 80 to again result. Engagement and disengagement of the drive hub 158 and the drive shaft 92 is accomplished by cam means including a pair of collars 166 and 168 disposed between the drive hub 158 and a base washer 170 and also surrounding the drive shaft 92. The upper collar 166 has a plurality of downwardly extending cam ramp surfaces, and the lower collar 168 has the same number, for example three, upwardly extending mating camp ramp surfaces. These collars act to axially move the drive hub 158 along the drive shaft 92 in a similar fashion as disclosed in U.S. Pat. No. 4,291,556 to Mason, previously incorporated by reference. In a like fashion to Mason, a shifter fork 172 is provided which is operated by the eccentric 147 for rotating the lower cam 168 such that the upper cam 166 which bears against the lower portion of the drive hub 158 through a support washer 174 may be raised a height equal to the height of the ramp surfaces of the collars 166 and 168.

During the spin portion of the cycle, spin basket 36 will be driven by a spin gear 176 having teeth 178 about the circumference which engage teeth 182 carried on a spin collar 180. Rotation of the spin collar 180 causes operation of the spin clutch and basket brake mechanism to effect rotation of the clothes bases 182. A delay means, shown generally at 184, is disposed in an annular groove 186 in the lower portion of the spin gear 176 will not be engaged to begin rotation of the basket 36 until a complete revolution of the main gear 146 in the counter-clockwise direction has occurred. One revolution is sufficient to insure that the shifter fork 172 will have changed positions and that the lower collar 168 will have rotated in the appropriate direction to disengage the drive hub 158 and the drive shaft 92. The program control means through timer 15 provides the signal necessary to reverse the direction of the motor between the spin and agitate portions of the wash cycle.

Figure 8:
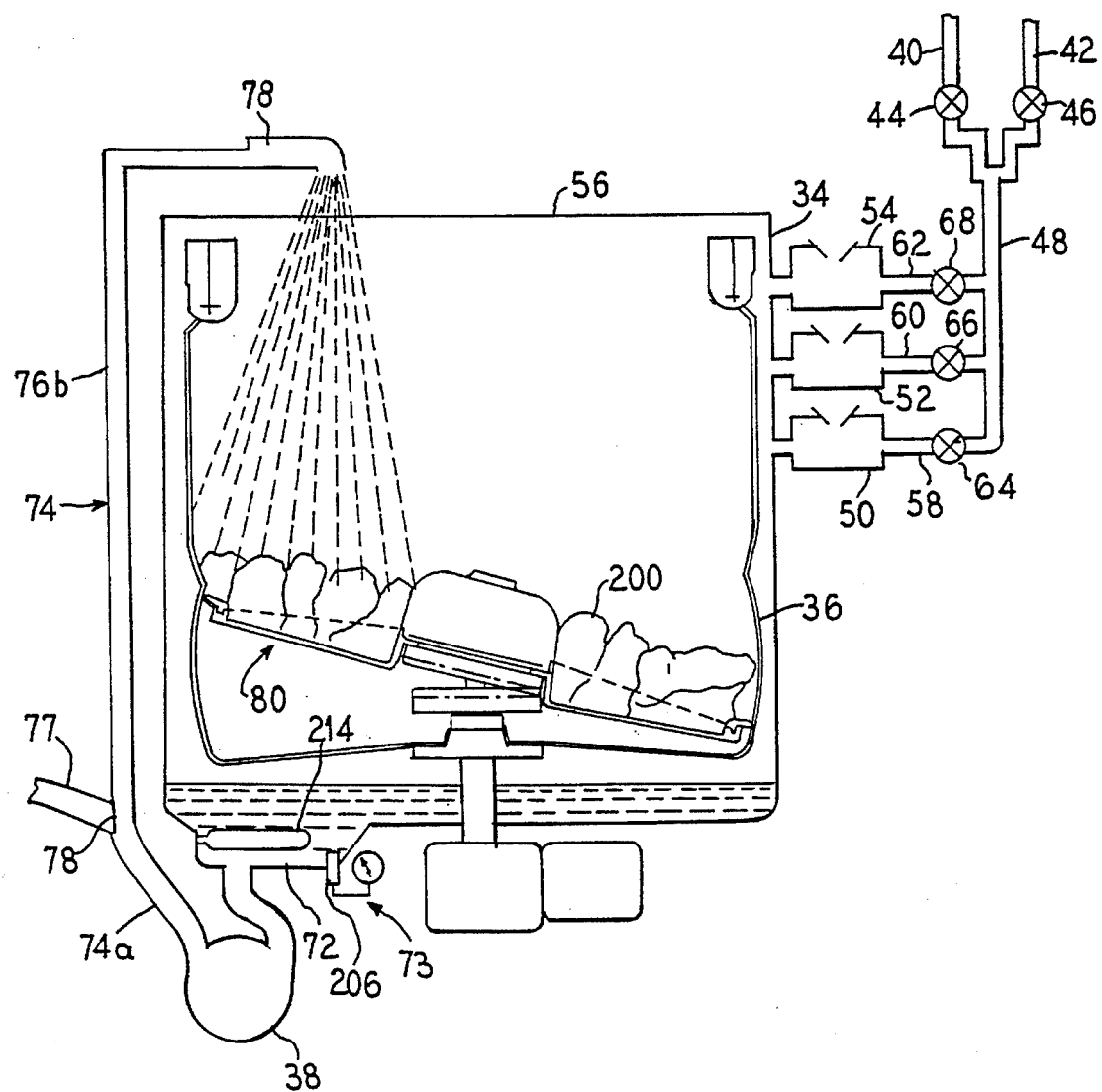
FIG. 8 is a schematic illustration of the fluid conduits and valves associated with the present invention.
Figure 9:
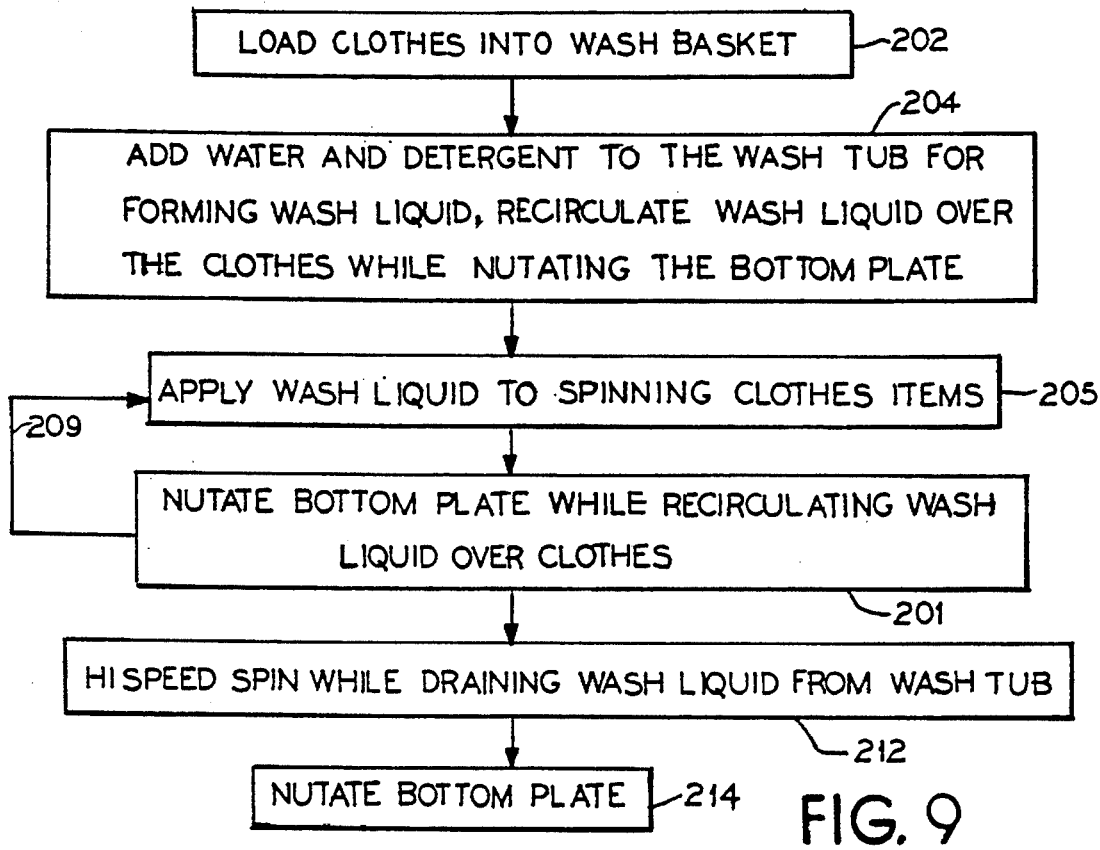
FIG. 9 is a flow chart diagram of the steps incorporated in the wash cycle for the automatic washer of FIGS. 1–4.
Figure 10:
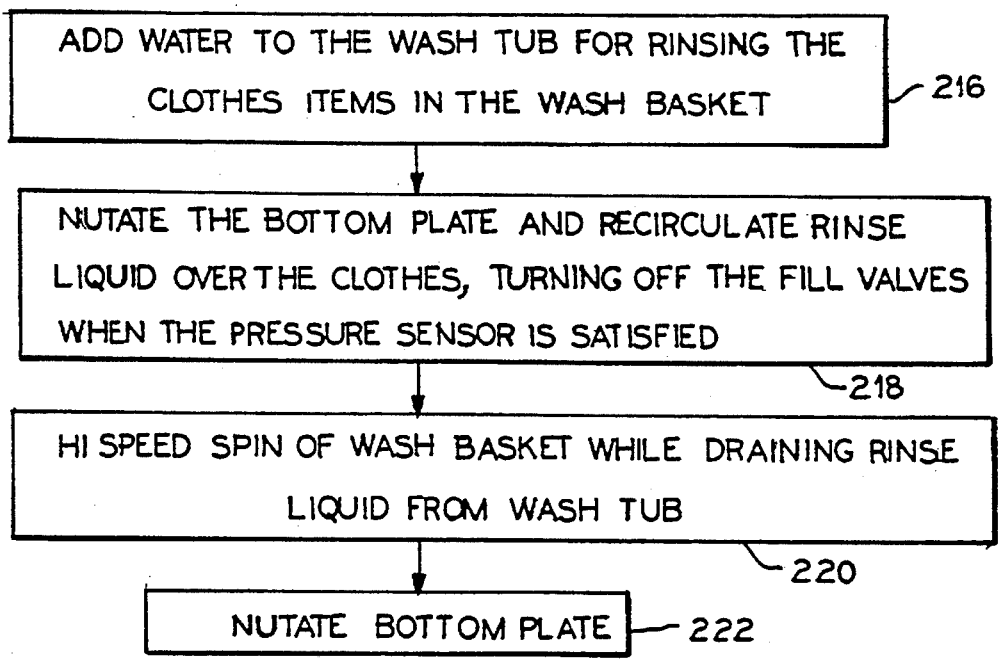
FIG. 10 is a flow chart diagram of the steps incorporated in the rinse cycle for the automatic washer of FIGS. 1–4.

Turning now to FIG. 8 in combination with FIGS. 9 and 10, the operation of the preferred embodiment of the washer may be understood. The first step in initiating the operation of the washer 20 is to load clothes items 200 into the wash basket 36, as stated in step 202, and as would be standard in any vertical axis washer. As is known, upon initial loading, the clothes items 200 may occupy a large volume of the wash basket 36 and have a total height approaching the upper lip of the wash basket 36. However, once wetted, the clothes items 200 will decrease in volume and occupy the lower portion of the wash basket 36.

As seen in step 204, water is added to the wash basket 36 in combination with detergent; either liquid or powdered, for washing the clothes. The detergent may be added to the washer during the initial fill cycle, preferably through a detergent dispenser such as the detergent dispenser 54 illustrated, in the required amount. As the washer fills, the detergent is flushed from the dispenser 54 into the tub 34 for collection in the sump 72, wherein a wash liquid is formed from the mixing of the supplied water and detergent. In the preferred embodiment, the detergent dispenser is configured to provide a quantity of detergent for mixing with the supplied water for forming a wash liquid having a detergent concentration of approximately 1% by weight. This level of concentration is relatively much greater than the concentrations of detergent used in conventional deep fill washers. Simultaneously or shortly after the introduction of wash liquid into the tub 34, recirculation of the wash liquid from the sump 72 through the recirculation line 74 and nozzle 78 over the clothes 200 may be initiated by energizing the pump 38.

Bottom plate wobble with rotation or nutation of the bottom plate 80 is initiated while recirculating wash liquid over the clothes items 200. The slow rotation of the bottom plate 80, about the axis of the drive shaft 92 causes the entire load of clothes items 200 to rotate within the wash basket 36. In this fashion, the entire load of clothes repeatedly circulates under the spray of wash liquid dispensed from the spray nozzle 78 such that all of the clothes are thoroughly wetted.

Subsequent to the initiation of the recirculation of wash liquid over the clothes items, the fill valves 44 and 46 are closed in response to the pressure sensor 73 located in the sump 72. In this fashion, the quantity of wash liquid added to the tub 34 is responsive to the size and absorbancy of the clothes load 200 such that the amount of water added to the wash tub is adequate for thoroughly wetting the clothes load 200 and for providing enough excess fluid in the sump 78 to supply the pump 38 while at the same time maintaining the wash liquid level in the wash tub 34 below the bottom plate 80 such that splashing and oversudsing problems are avoided. In this fashion, the clothes are washed in an out-of-water wash process which maximizes water and energy savings. An "out-of-water" wash process may be understood to be a wash process wherein the clothes items in a wash basket are not submerged in a large volume of wash liquid during the wash step but rather, the clothes items are held out of the wash liquid during the wash step while liquid is continually recirculated over and through the clothes items by a spray means. In the preferred embodiment, the wash basket volume is three cubic feet which is equivalent to present large volume washers for home use. With this size wash basket and a correspondingly sized wash tub 34, the water level control preferably operates to provide 1–4 gallons of water to the wash tub in excess of the quantity absorbed by the clothes items. The sump 72 is configured such that this quantity of excess wash liquid is adequate to supply the pump 38 for recirculation.

In step 205, the operation of the washer may be enhanced by the use of a high performance spray wash process. In this step, the clothes items 200 are not mechanically agitated, rather, the clothes items 200 are spun with the basket 36 at a speed great enough such that centrifugal force urges the clothes items against the inner periphery of the basket wall while at the same time wash liquid is applied to the spinning clothes items. The application of the wash liquid is accomplished by directing the wash liquid through the spray nozzle 78 for spraying wash liquid against the clothes items held against the basket wall. This type of step is further described in U.S. Pat. No. 4,784,666 to Brenner et. al., having the same assignee as the present application, the disclosure of which is hereby incorporated by reference. In the preferred embodiment, the wash basket 36 is spun at a speed of approximately 400 RPM during step 205.

If during high speed spinning, an out-of-balance condition for the spinning basket is sensed, the spin cycle may be interrupted and the bottom plate may be nutated to redistribute the clothes for correcting the off-balance condition. This redistribution of clothes by bottom plate nutation may occur during the high performance spray wash process described above or during any high speed basket spin step.

In step 208, the wash basket is held stationary and the bottom plate 80 is nutated while wash liquid is recirculated over the clothes items. During this step, the wash pump 38 is operated for continuing recirculation of wash liquid over the clothes items 200. In this fashion, the clothes items 200 successively rotate through the spray of wash liquid dispensed from the spray nozzle 78. Furthermore, the rapid wobble motion imparted to the bottom plate 80 causes the clothes to jostle within the basket 36, thereby creating the required flexing and movement of the clothes items to properly remove soil thereon. In the preferred embodiment, the speed of the bottom plate rotation during nutation may be 3–6 RPM while the bottom plate may wobble at approximately 290 oscillations/minute.

It can be understood that it is important to maintain engagement between the bottom plate 80 and the clothes items 200. If during slow speed rotation, the bottom plate 80 rotates but the clothes do not, the utility of bottom plate rotation is partially defeated. Therefore, to ensure predictability in wash performance, engagement between the clothes items and bottom plate is caused by the ribs 86 wherein the ribs 86 ensure corresponding rotation of the clothes 200 with the bottom plate 80. Engagement may also be achieved by a roughened bottom plate surface or by elastomeric pads applied to the bottom plate 80.

If, as a result of additional absorption of wash liquid by the clothes items 200, additional wash liquid is required, additional water may be added during steps 205 or 208 until pressure sensor 73 is satisfied. As shown by loop 209, steps 205 and 208 may be repeated a predetermined number of times for providing the optimum wash cycle.

The operation of the washer during the wash cycle may be interrupted wherein the washer 20 is stalled and a heater 210 may be energized for heating the wash liquid to an optimal wash temperature. This step is optional, dependent on the desired wash performance, washer water level and initial water fill temperature and may be further understood to be conducted at any time during the wash or rinse cycle when the sump has an adequate quantity of wash liquid.

Furthermore, during step 208, bleach may be added to the wash tub. The bleach may be added to the washer during the latter portion of step 208, preferably through a bleach dispenser such as the bleach dispenser 50 illustrated, at the required dosage. This is accomplished at the desired time by adding additional water to the tub through the bleach dispenser for flushing bleach into the wash tub, wherein the bleach mixes with the wash liquid and is sprayed onto the clothes items by way of wash liquid recirculation.

At the conclusion of the wash cycle, as shown in step 212, the wash basket is driven at a high speed spin while the extracted wash liquid from the clothes items is sent to drain by actuation of the two-way valve 76 to direct wash liquid to line 77 from the sump 72. This step is similar to the standard high speed extraction process for vertical axis washers. Subsequent to this step, the bottom plate is nutated, as shown at 214, for fluffing the clothes in preparation for the rinse cycle.

The rinse cycle for the preferred embodiment of the washer 20, is set forth in FIG. 10. In step 216, water is added to the tub. In step 218, nutation of the bottom plate 80 and recirculation of the rinse liquid over the clothes items is initiated. This step serves to move the clothes items 200 under the rinse liquid spray in a similar fashion as described above. Furthermore, the fill valves are turned off in response to the pressure sensor 206 as described above.

Subsequent to step 218, the wash basket is driven at a high speed spin while the extracted wash liquid from the clothes items is sent to drain by actuation of the three-way valve 76 to direct rinse liquid to line 77 from the sump 72, as shown in step 220. This step is similar to the standard high speed extraction process for vertical axis washers.

Steps 216, 218 and 220 may be repeated any predetermined number of times for ensuring that the clothes items are adequately rinsed. Furthermore, fabric softener may be added to the rinse liquid during one of the rinse cycles. The fabric softener may be added to the washer, preferably through a fabric softener dispenser such as the fabric softener dispenser 52 illustrated, at the required dosage. During the addition of rinse liquid into the tub 34, water is flushed through the fabric softener dispenser for flushing fabric softener into the wash tub, wherein the softener mixes with the rinse liquid and is sprayed onto the clothes items by way of rinse liquid recirculation.

The rinse operation of the washer may be further enhanced by including a spray rinse step during each rinse cycle. In a spray rinse step the basket 36 is spun at a speed sufficient to hold the clothes items, responsive to the urgings of centrifugal force, against the wash basket wall and to apply rinse water to the spinning clothes by way of the nozzle 78. This type of step is further described in U.S. Pat. No. 5,167,722 to Pastryk et. al., having the same assignee as the present invention, the disclosure of which is hereby incorporated by reference. In the preferred embodiment, the wash basket 36 may be spun at a speed of approximately 400 RPM during the spray rinse step.

Finally, the bottom plate is nutated, as shown at 222, for fluffing the clothes in preparation for removal by the operator. This step removes the clothes items 200 from the inner periphery of the wash basket 36, where they were urged due to centrifugal force, and disposes the clothes loosely within the wash basket 36. This fluffing operation, therefore, presents to the operator, at the conclusion of the washer operation, clean clothes having undergone a centrifugal extraction process and yet being loosely disposed within the wash basket 36 rather than being plastered along the inner periphery of the wash basket as is common in conventional washers. In this fashion, the ease of removal of the clothes from the wash basket at the conclusion of wash cycle is improved.

Figure 11:
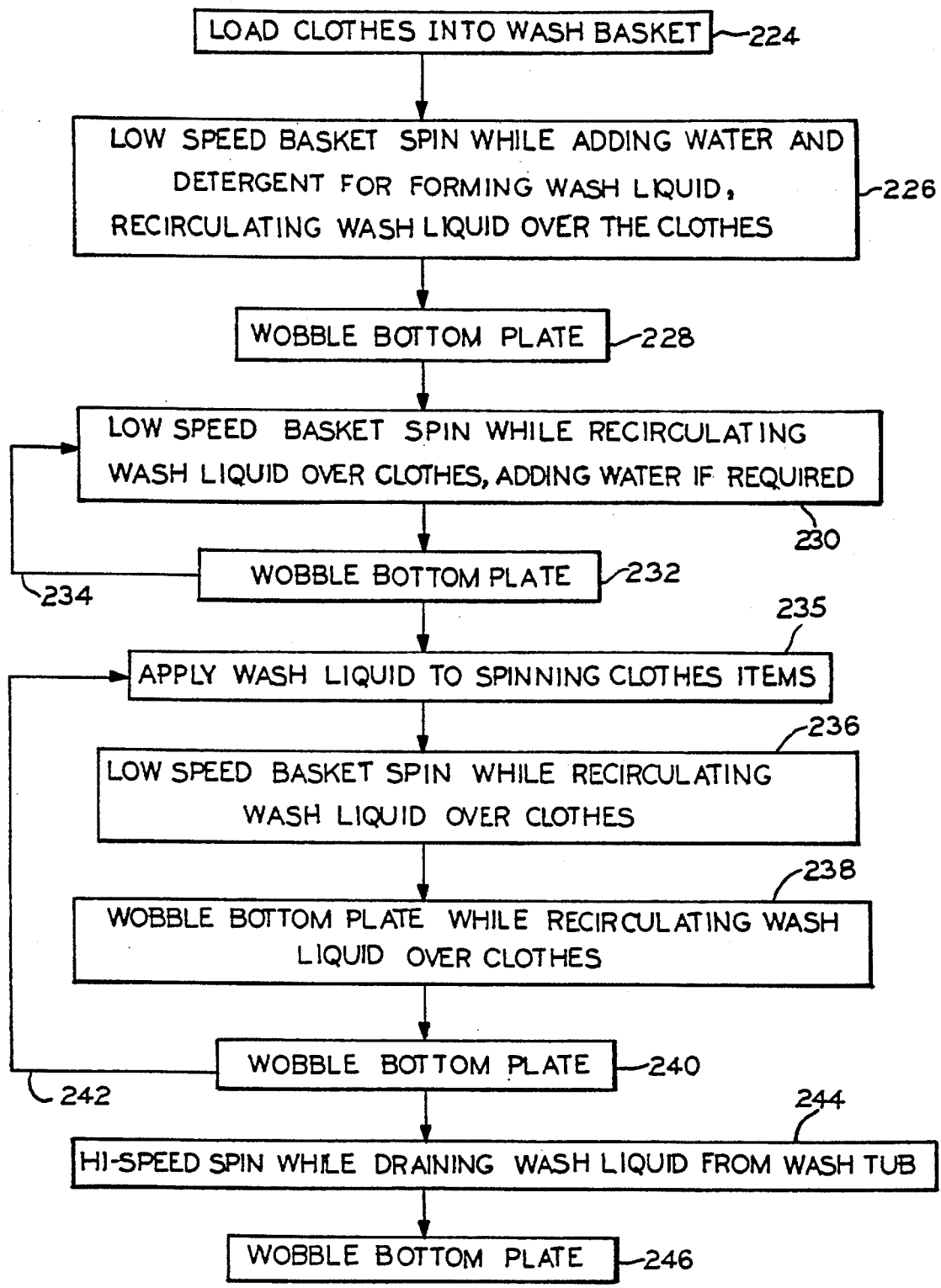
FIG. 11 is a flow chart diagram of the steps incorporated in an alternate wash cycle.
Figure 12:
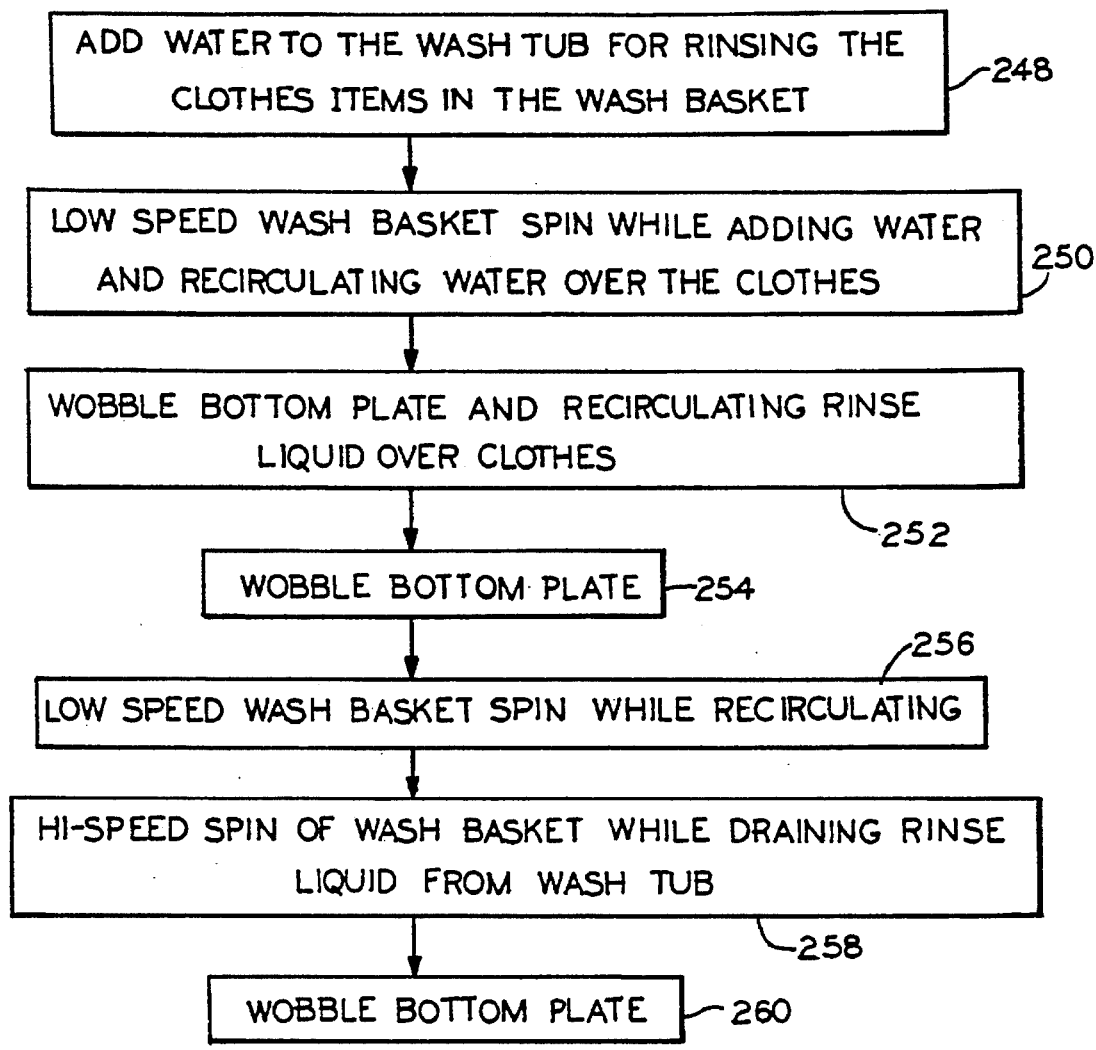
FIG. 12 is a flow chart diagram of the steps incorporated in an alternate rinse cycle.

Turning now to FIG. 11 and 12, an alternate operation of the present invention may be understood. This method of operation may be more appropriate wherein the bottom plate 80 is not driven in a nutating mode (bottom plate wobble with rotation), but rather only a wobble mode with no rotation. In a solely wobbling mode wherein no rotation of the bottom plate 80 occurs for moving the clothes items rotationally within the wash basket 36, it may be necessary to add various steps of slowly rotating the basket 36 successive with the steps of wobbling the bottom plate 80 to ensure that all of the clothes items are repeatedly moved under the spray of the recirculating wash liquid. It can be understood that these steps could be used in a nutating mode as well.

The first step in initiating the operation of the washer 20 is to load clothes items 200 into the wash basket 36, as stated in step 224, and as would be standard in any vertical axis washer.

As seen in step 226, water is added to the wash basket 36 in combination with detergent; either liquid or powdered, for washing the clothes, in like fashion to step 204. Simultaneously or shortly after the introduction of wash liquid into the tub 34, recirculation of the wash liquid from the sump 72 through the recirculation line 74 and nozzle 78 over the clothes 200 may be initiated by energizing the pump 38. During initial recirculation, the wash basket 34 begins a low speed spin, such as 20 RPM. The low speed rotation moves the entire load of clothes repeatedly under the spray of wash liquid dispensed from the spray nozzle 78 such that all of the clothes are thoroughly wetted.

Subsequent to the initiation of the recirculation of wash liquid over the clothes items, the fill valves 44 and 46 are closed in response to the pressure sensor 73 located in the sump 72 in a like fashion as described above.

In step 228, the fill valves are deenergized and the wash basket is held stationary while the bottom plate 80 is wobbled. In this step the clothes are thoroughly wetted, but not submerged in the wash liquid. The clothes are subject to the wobbling of the bottom plate 80 which causes each successive portion of the clothes load 200 to alternatively rise and fall wherein the clothes are jostled together and experience the required mechanical energy input required to flex and move the clothes to achieve excellent soil removal.

After a predetermined time, the wobbling of the bottom plate is stopped and a low speed spin of the wash basket is recommenced while recirculating the wash liquid over the clothes load 200 through nozzle 78, as shown in step 230. If, as a result of additional absorption of wash liquid by the clothes items 200, additional wash liquid is required, additional water may be added until pressure sensor 73 is satisfied. Subsequent to step 210, the bottom plate may again be driven in wobble mode, as shown in step 232. Steps 230 and 232 may be repeated any number of predetermined times, as shown by loop 234, to ensure thorough wetting of the wash items 200.

At any time during the operation the wash cycle, when the sump is filled with wash liquid, the washer may be stalled and the heater 210 may be energized for heating the wash liquid to an optimal wash temperature. This step is optional, dependent on the desired wash performance, washer water level and initial water fill temperature and may be further understood to be conducted at any time during the wash or rinse cycle when the sump has an adequate quantity of wash liquid.

In step 235, the washer may again be operated in a high performance spray wash mode, as previously described in step 205. If during high speed spinning, an out-of-balance condition for the spinning basket is sensed, the spin cycle may be interrupted and the bottom plate may be wobbled to redistribute to redistribute the clothes for correcting the off-balance condition. This redistribution of clothes by bottom plate wobbling may occur during the high performance spray wash process described above or during any high speed basket spin step. In step 236, the clothes items 200 may again be subjected to a low speed spin while having wash liquid recirculated over the clothes. In step 238, the wash basket 36 is held fixed while the bottom plate is wobbled and wash liquid is recirculated over the clothes items 200. In step 240, the recirculation of wash liquid is stopped and the bottom plate is wobbled. These steps, 235, 236, 238 and 240 may be repeated a predetermined number of times as shown by loop 242.

At the conclusion of the wash cycle, as shown in step 244, the wash basket is driven at a high speed spin while the extracted wash liquid from the clothes items is sent to drain by actuation of the three-way valve 76 to direct wash liquid to line 77 from the sump 72. This step is similar to the standard high speed extraction process for vertical axis washers. Subsequent to this step, the bottom plate is nutated, as shown at 246, for fluffing the clothes in preparation for the rinse cycle.

The rinse cycle for the alternative embodiment of the washer 20, is shown in FIG. 11. In step 248, water is added to the tub. In step 250, low speed spinning of the wash basket occurs while recirculation of the rinse liquid over the clothes items is initiated. This step serves to move the clothes items 200 under the rinse liquid spray. Furthermore, the fill valves are turned off in response to the pressure sensor 206 as described above.

In step 252, the fill valves are deenergized and the wash basket is held stationary while the bottom plate 80 is wobbled and wash liquid is recirculated over the clothes items 200. In step 254, recirculation is stopped and the bottom plate is wobbled. In both steps 252 and 254, therefore, the clothes are thoroughly wetted, but not submerged in the wash liquid. The clothes are subject to the relatively violent wobbling of the bottom plate 80 which causes each successive portion of the clothes load 200 to alternatively rise and fall wherein the clothes are jostled together to achieve adequate rinsing.

In step 256, the clothes items 200 may again be subjected to a low speed spin while having rinse liquid recirculated over the clothes. Subsequent to step 256, the wash basket is driven at a high speed spin while the extracted wash liquid from the clothes items is sent to drain by actuation of the three-way valve 76 to direct rinse liquid to line 77 from the sump 72, as shown in step 258.

Steps 250, 252, 254, 256, and 258 may be repeated any predetermined number of times for ensuring that the clothes items are adequately rinsed. Furthermore, fabric softener may be added to the rinse liquid during one of the rinse cycles, as previously described.

The rinse operation of the washer may be further enhanced by including a spray rinse step during each rinse cycle as previously described above.

Finally, the bottom plate is nutated, as shown at 260, for fluffing the clothes in preparation for removal by the operator. This fluffing operation, in a like fashion as described above, presents to the operator, at the conclusion of the washer operation, clean clothes having undergone a centrifugal extraction process and yet being loosely disposed within the wash basket 36 rather than being plastered along the inner periphery of the wash basket as is common in all conventional washers. In this fashion, there is improvement in the ease of removal of the clothes from the wash basket at the conclusion of the wash cycle.

It can be seen that the present invention successfully provides a highly efficient and effective automatic washer. In particular, it can be understood that the mechanical energy imparted into the clothes items through the wobbling action of a bottom plate is particularly well suited for use in combination with an out-of-water wash process. Further, use of a controlled rotation gear system for driving the bottom plate can be understood to provide a highly desirable bottom plate motion including both a wobbling motion and a slow rotation motion relative to the wash basket.

While the above description contains many specifications, these should not be construed as limitations on the scope of the invention, but rather as an exemplification of one preferred embodiment thereof. Many modifications and variations are possible, and may readily occur to those skilled in the art. For example, the level of wash liquid during the wash cycle and rinse cycle may be controlled such that the clothes items in the wash basket are partially or completely submerged by wash liquid. With this modification, some of the beneficial water savings may be lost but the action of the bottom plate may still be effective for washing clothes. In addition, different systems for driving the bottom plate may be contemplated. For example, the wobble gear 106 and straight base gear 96 described above may be constructed to engage each other frictionally, rather than by meshing gear teeth. In this fashion, the wobble gear would become a wobble plate and the straight base gear would become a base plate, wherein the wobble plate and base plate frictionally engage each other to control bottom plate rotation. Further, the controlled rotation gear system may be constructed wherein a wobble gear 106 is provided for engaging a base plate having a rubber-like surface for engaging the teeth of the wobble gear, and vice-versa. Accordingly, the scope of the invention should be determined not by the embodiments illustrated but by the appended claims and their equivalents.

We claim:

1. A method of rinsing clothes items in a vertical axis washer, said washer having a wash basket rotatably disposed in a wash tub, a motor drivingly interconnected with said wash basket for rotating said basket, a bottom plate disposed within the lower portion of said wash basket, said bottom plate being drivingly interconnected with said motor such that said bottom plate may be driven in a nutating manner within said wash basket, said method of rinsing comprising the steps of:

(1) supplying rinse liquid into said wash tub;

(2) nutating said bottom plate for effecting agitation of said clothes items and for rotating said clothes items within said wash basket;

(3) while directing a spray of recirculating rinse liquid onto said nutating clothes items; and (4) draining said rinse liquid from said wash tub.

2. The method of rinsing clothes in a vertical axis washer according to claim 1, further comprising the steps of:

spinning said wash basket at a speed to effect more than one centrifugal force on said clothes items during the step of draining rinse liquid from said wash tub.

3. The method of rinsing clothes in a vertical washer according to claim 1, further comprising the steps of:

spinning said wash basket at a speed to effect less than one gravity centrifugal force on said clothes items while directing a spray of recirculating rinse liquid onto said spinning clothes items.

4. The method of rinsing clothes in a vertical axis washer according to claim 1, further comprising the steps of:

nutating said bottom plate for effecting fluffing of said clothes items subsequent to said draining of said wash liquid.

5. The method of rinsing clothes in a vertical axis washer according to claim 1, wherein the step of nutating said bottom plate further comprises rotating said bottom plate at a speed from 2–6 RPM.

6. The method of rinsing clothes in a vertical axis washer according to claim 1, further comprising the steps of:

supplying rinse liquid to said wash tub prior to recirculating rinse liquid over said clothes items; and controlling the amount of rinse liquid added to said wash tub such that the level of rinse liquid in said tub during said nutation of said bottom plate is below said bottom plate.

7. The method of rinsing clothes in a vertical axis washer according to claim 6, further comprising the steps of:

adding a quantity of fabric softener to said wash tub with said supplied rinse liquid.

8. The method of rinsing clothes in a vertical washer according to claim 1, further comprising the steps of:

rotating said wash basket and said clothes items at a speed that is sufficient to maintain the load plastered against the peripheral wall of said wash basket while directing a spray of recirculating rinse liquid onto said spinning clothes items.

9. A method of rinsing clothes items in a vertical axis washer, said washer having a wash basket rotatably disposed in a wash tub, a motor drivingly interconnected with said wash basket for rotating said basket, a bottom plate disposed within the lower portion of said wash basket, said bottom plate being drivingly interconnected with said motor for wobbling in a gyratory oscillating manner within said wash basket, said method of washing comprising the steps of:

(1) supplying rinse liquid into said wash tub;

(2) spinning said wash basket at a speed to effect less than one gravity centrifugal force on said clothes items;

(3) directing a spray of rinse liquid onto said spinning clothes items;

(4) subsequently wobbling said bottom plate for effecting agitation of said clothes items while spraying rinse liquid onto said clothes items;

(5) repeating steps 2, 3 and 4 a predetermined number of times; and (6) draining said rinse liquid from said wash tub.

10. The method of rinsing clothes in a vertical axis washer according to claim 9, further comprising the steps of:

wobbling said bottom plate for effecting fluffing of said clothes items subsequent to said draining of said rinse liquid.

11. The method of rinsing clothes in a vertical axis washer according to claim 9, wherein the step of spinning said wash basket at a speed to effect less than one gravity of centrifugal force further comprises rotating said wash basket at an approximate speed of 30 RPM.

12. The method of rinsing clothes in a vertical axis washer according to claim 9, wherein step 3 further includes directing a spray of rinse liquid onto said spinning clothes items and sending the rinse liquid to drain and subsequently directing a spray of recirculating rinse liquid onto said spinning clothes items.

13. The method of rinsing clothes in a vertical axis washer according to claim 9, wherein step 4 further includes directing a recirculating spray of rinse liquid onto the agitating clothes items.

14. The method of rinsing clothes in a vertical axis washer according to claim 9, further comprising the steps of:

supplying rinse liquid to said wash tub prior to recirculating rinse liquid over said clothes items;

controlling the amount of rinse liquid added to said wash tub such that the level of wash liquid in said tub during said wobbling of said bottom plate is below said bottom plate.

15. The method of rinsing clothes in a vertical axis washer according to claim 14, further comprising the steps of:

adding a quantity of fabric softner to said wash tub with said supplied rinse liquid.

16. The method of rinsing clothes in a vertical washer according to claim 9, further comprising the steps of:

rotating said wash basket and said clothes items at a speed that is sufficient to maintain the load against the peripheral wall of said wash basket while directing a recirculating spray of rinse liquid onto said spinning clothes items.

17. A method of rinsing clothes in a vertical washer according to claim 9, further comprising the steps of:

wobbling said bottom plate for effecting agitation of said clothes items while directing a recirculating spray of rinse wash liquid onto said clothes items.

18. A method of rinsing clothes items in a vertical axis washer, said washer having a wash basket rotatably disposed in a wash tub, a motor drivingly interconnected with said wash basket for rotating said basket, a bottom plate disposed within the lower portion of said wash basket, said bottom plate being drivingly interconnected with said motor such that said bottom plate may be driven in a nutating manner within said wash basket, said method of rinsing comprising the steps of:

(1) supplying a quantity of rinse liquid into said wash basket;

(2) rotating said wash basket and said clothes items at a speed that is sufficient to maintain the load against the peripheral wall of said wash basket;

(3) while directing a spray of rinse liquid onto said spinning clothes items;

(4) nutating said bottom plate for effecting agitation of said clothes items and for rotating said clothes items within said wash basket;

(5) directing a recirculating spray of rinse liquid onto said nutating clothes items;

(6) repeating steps 2, 3, 4 and 5 a predetermined number of times; and (7) draining said rinse liquid from said wash tub.

19. The method of rinsing clothes in a vertical axis washer according to claim 16, further comprising the steps of:

supplying rinse liquid to said wash tub prior to recirculating wash liquid over said clothes items;

controlling the amount of rinse liquid added to said wash tub such that the level of wash liquid in said tub during said nutation of said bottom plate is below said bottom plate.

20. The method of rinsing clothes in a vertical axis washer according to claim 16, wherein step 3 further includes directing a spray of rinse liquid onto said spinning clothes items and sending the rinse liquid to drain and subsequently directing a spray of recirculating rinse liquid onto said spinning clothes items.

21. The method of rinsing clothes in a vertical washer according to claim 16, further comprising the steps of:

spinning said wash basket at a speed to effect less than one gravity centrifugal force on said clothes items while directing a recirculating spray of rinse liquid onto said spinning clothes items.

22. A method of rinsing clothes in a vertical axis washer according to claim 16, further comprising the steps of:

nutating said bottom plate for effecting fluffing of said clothes items subsequent to said draining of said rinse liquid.

23. A method for rinsing clothes items in a vertical axis clothes washer, said washer having a wash basket, a bottom plate disposed within the lower portion of said wash basket, and a motor drivingly interconnected with said bottom plate, such that said bottom plate may be driven in a wobbling manner within said wash basket, said method of rinsing comprising the steps of:

(1) applying rinse liquid onto said clothes items;

(2) agitating said clothes items out of said rinse liquid by wobbling said bottom plate within said wash basket; and (3) removing said rinse liquid from said clothes items.

24. A method for rinsing clothes items in a vertical axis washer according to claim 23, wherein step (1) comprises directing a recirculating spray of rinse liquid onto said clothes items.

25. A method for rinsing clothes items in a vertical axis washer according to claim 24, wherein step (1) comprises rotating said clothes items in said basket to pass through said recirculating spray of rinse liquid.

26. A method for rinsing clothes items in a vertical axis washer according to claim 23, wherein step (1) comprises filling said tub with said rinse liquid to a predetermined level.

27. A method for rinsing clothes items in a vertical axis washer according to claim 26, wherein said predetermined level of said rinse liquid in said tub during step (1) is beneath the lowest portion of said wobbling bottom plate.

28. A method for rinsing clothes items in a vertical axis washer according to claim 26, wherein said predetermined level of said rinse liquid in said tub during step (1) is above the lowest portion of said wobbling bottom plate, such that the lowest portion said wobbling bottom plate dips into said rinsing liquid to wet said clothes items.

29. A method for rinsing clothes items in a vertical axis washer according to claim 26, wherein all of said clothes items are not simultaneously submerged beneath said predetermined level of rinse liquid.

30. A method for rinsing clothes items in a vertical axis washer according to claim 23, wherein step (2) comprises nutating said bottom plate to wobble and rotate said clothes items within said basket.

* * * * *